Sept. 27, 1938.   A. R. VAN C. WARRINGTON   2,131,608
PROTECTIVE APPARATUS
Filed Aug. 5, 1937
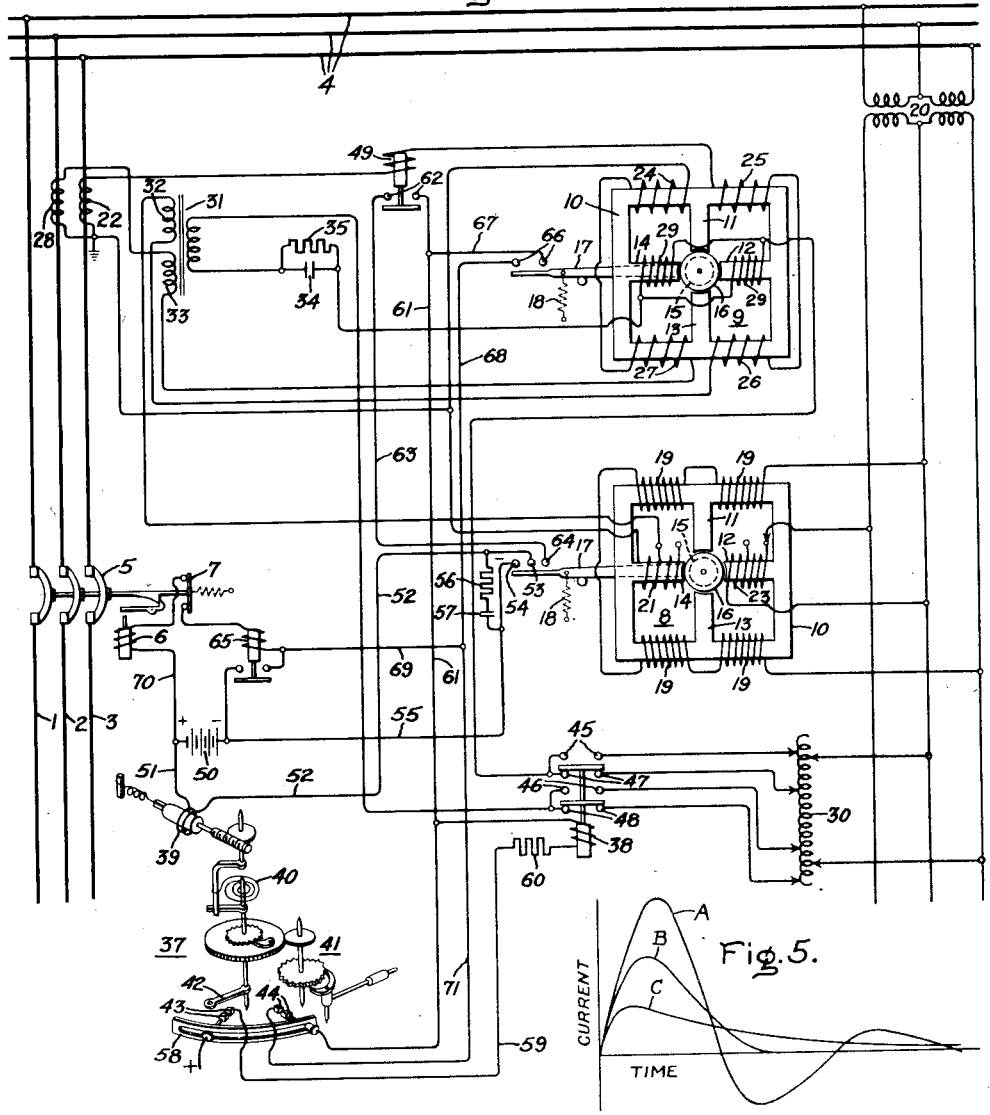
Fig. 1.
Fig. 5.
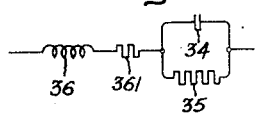
Fig. 2.
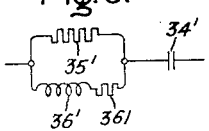
Fig. 3.
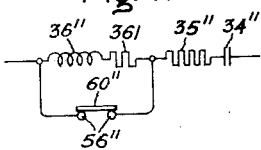
Fig. 4.
Inventor:
Albert R. van C. Warrington,
by Harry E. Dunham
His Attorney.

Patented Sept. 27, 1938

2,131,608

UNITED STATES PATENT OFFICE 2,131,608

PROTECTIVE APPARATUS

Albert R. van C. Warrington, Springfield, Pa., assignor to General Electric Corporation, a corporation of New York Application August 5, 1937, Serial No. 157,530

11 Claims. (Cl. 175—294)

My invention relates to improvements in protective apparatus for alternating current electric systems and more particularly to improvements in high-speed protective relays and especially such relays as have a winding of constant impedance. In general, my invention relates to improvements in protective apparatus such as is disclosed in the copending application of Oliver C. Traver, Serial No. 115,970, filed December 15, 1936, for Protective apparatus and assigned to the same assignee as this invention. One object of my invention is to provide improved high-speed fault-responsive protective relay apparatus in which false action, due to transient conditions in the actuating windings of the apparatus arising at the moment a short-circuit occurs and when a short-circuit is cleared from the circuit to be protected, is prevented. Another object of my invention is to provide an improved high-speed, fault-responsive protective apparatus wherein the necessity of a time delay for the quantities, derived from the circuit to operate the apparatus, to reach the actual fault values is substantially eliminated. These and other objects of my invention will appear in more detail hereinafter.

In any circuit containing inductive and capacitive reactance, a sudden change in potential across the circuit tends to cause oscillations which will die away after a period, depending upon the magnetic and electric (resistance) losses of the circuits. Whether or not operation occurs depends upon the resistance and reactance (both inductive and capacitive) values of the circuit. When the voltage suddenly changes from normal to the fault value, the potential across any one part of the circuit will not necessarily immediately assume its new value proportional to the change in circuit voltage but may slowing decrease to the final value or may overshoot the final value and then oscillate about that value. Thus at the initiation of the fault and before the final voltage or current condition is reached, the voltage across one part of the circuit, for example, a relay winding may go through a series of artificial values before reaching the value corresponding to the fault condition. These artificial values of voltages may affect the operating point of the device and thus cause false operation.

In accordance with my invention I avoid this false operation by making the relay operating circuit critically damped; that is to say, all parts of the circuit assume in the shortest possible time voltage and current values in proper proportion to the voltage on the total circuit.

My invention will be better understood from the following description when considered in connection with the accompanying sheet of drawings, and its scope will be pointed out in the appended claims.

In the accompanying drawing, Fig. 1 illustrates diagrammatically an embodiment of my invention in a distance relay type of protective arrangement; Fig. 2 illustrates schematically in diagram the circuit of the potential winding of the ohm unit of the distance relay shown in Fig. 1; Figs. 3 and 4 illustrate schematically in diagram other embodiments of my invention and Fig. 5 is a curve diagram explanatory of my invention.

In the embodiment of my invention shown in Fig. 1, a polyphase alternating current circuit comprising phase conductors 1, 2, and 3 is arranged to be connected to a polyphase station bus 4 through suitable means shown as a latch-closed circuit breaker 5. This is provided with a trip coil 6 and an auxiliary switch 7, which is arranged to be closed when the circuit breaker is closed, and to be opened when the circuit breaker is opened, for purposes which will hereinafter appear. As is well-known to the art, the circuit 1—2—3 may be continued through other stations to form a sectionalized power system.

In order to control the circuit breaker 5 in accordance with the distance between the polyphase bus 4 and a fault on the occurrence of faults on the circuit 1—2—3, there may be provided two distance responsive relay devices 8 and 9, which may be defined as the starting unit and ohm unit, respectively, of a distance relay. It is not necessary that the ohm unit 9 be a metering device in the sense that it has to have a movable member, the magnitude of whose movement or position is dependent on ohms. In other words, for the purpose in hand it is sufficient that movement of the movable member occur, when the ratio of the quantities which establish the ohmic condition departs from a given value on the occurrence of a fault.

The distance responsive relay devices 8 and 9 may have different impedance response characteristics in order to obtain a high degree of selectivity. As illustrated in the accompanying drawing, each of the devices or units 8 and 9 may comprise a magnetic core or stator 10 having a plurality of inwardly projecting salients 11, 12, 13, and 14, and suitable energizing windings thereon. Centrally disposed with respect to the inner ends of the salients is a magnetic stator 15, indicated by a broken line circle, and rotatable in the gaps between the ends of the salients and the stator 15 is an electric current conducting element 16 such as a generally cylindrical or cup-shaped member of copper or aluminum, the movement of which controls the actuation of a controlling member 17. This member may be a contact controlling member arranged to close contacts in one position and to be biased from this position against a suitable stop by a light spring 18 sufficient to insure the opening of the member if the associated device is not energized.

The starting unit 8 includes a potential winding which, as shown, comprises four series-connected coils 19 arranged on the rim of the stator 10. This potential winding is connected to be energized in accordance with the voltage $E_{23}$ across the phase conductors 2 and 3 through suitable means such as a potential transformer 20 connected to the polyphase bus 4. The salient 14 of the starting unit 8 carries a winding 21, which is connected to be energized in accordance with the current $I_3$ in the phase conductor 3 of the circuit to be protected through suitable means such as a current transformer 22. As shown, the winding 21 may be provided with taps for pick-up adjustment purposes. The windings 19 and 21 provide a directional torque on the rotor 17 which is proportional to $EI \cos(\phi - \theta_1)$, where E and I are the voltage and current of the phase 2—3 at the station bus 4, $\phi$ the power factor angle of the circuit, and $\theta_1$ the angle between E and I for the maximum sensitivity or torque of the starting unit. It will be obvious from the expression above that the torque is a directional torque.

In order to obtain the desired distance response characteristic, the starting unit 8 includes another potential winding 23 positioned on the salient 12. The potential windings 19 and 23 cooperate to produce a torque proportional to $E^2$ which acts in a direction to hold the contact controlling member 17 in the circuit opening position. As shown, the magnitude of this torque can be controlled by means of taps whereby to vary the number of turns in use in the winding.

The resultant torque on the rotor 16 in the direction to effect a circuit closing action of the circuit controlling member 17 is then, $$EI \cos(\phi - \theta_1) - K_1 E^2,$$

$K_1$ being a constant. At the balance point of the device, the two torques represented by the two terms in this expression will be equal in magnitude and from this equality, there is derived the expression $$\frac{I}{E} = \frac{K_1}{\cos(\phi - \theta_1)}$$

In other words, the starting unit 9 operates to close its contacts when the admittance component $$\frac{I}{E} \cos(\phi - \theta_1)$$

exceeds $K_1$ and is positive. This can be expressed in the form of an impedance response characteristic $$\frac{Z_1}{\cos(\phi - \theta_1)} = \frac{I}{K_1}$$

The ohm unit 9 responds to the reactance of the protected circuit. For this purpose, the ohm unit may comprise a current winding shown as including four coils 24, 25, 26, and 27 on the rim of the stator 10. These may be connected in series and energized in accordance with the current in one of the phase conductors of the circuit 1—2—3. However, in order to have the same reactance response for all faults at a given point whether two or more phase conductors are involved, these coils may be energized to provide a current energization I, which is equal to the vectorial difference between the currents in two phase conductors of the circuit. Thus, the coils 24 and 27 may be energized from a current transformer 28 in the phase conductor 2 and the coils 25 and 26 from the current transformer 22 in the phase conductor 3, the coils being so arranged that the flux they produce in the salients 11 and 13 is dependent on the difference between the currents $I_2$ and $I_3$ in the phase conductors 2 and 3. In addition to the current energized winding, there is another winding, shown as comprising parallel connected coils 29 on the salients 12 and 14. The energization of these coils is dependent on the difference between a voltage of the circuit 1—2—3 at the station bus 4 and a voltage which is substantially equivalent to the voltage of this circuit for a short circuit at that remote point of the circuit for which operation of the ohm unit is desired. For this purpose, the coils 29 may be connected across the phase 2—3 of the potential transformer 20 through an auto-transformer 30 and in series with a high reactance transformer 31 which provides the desired reactance equivalent drop. When it is desired to use the difference between the currents of two phase conductors, the transformer 31 is provided with two primary current windings 32 and 33, which in the arrangement shown are respectively connected to be energized from the current transformers 22 and 28, or in other words in accordance with the currents in the phases adjacent the delta phase that is being protected. The high reactance transformer 31 provides a ready means for getting the desired reactance voltage drop to match the voltage of the circuit for the selected balance or operating point and moreover reduces the burden on the current transformers. Suitable taps on the auto-transformer 30 provide a wide range of operating reactance values for the ohm unit and also facilitate close adjustments whereby to obtain a high degree of selectivity in response. Inasmuch as the ohm unit winding 29 is energized by the difference between a voltage of the line at the station and a voltage obtained from the high reactance transformer 31, variation in line frequency tends to have no effect on the balance between these two voltages because both are varied in the same ratio. Hence, there is substantially no change in the distance point at which operation of the ohm unit occurs, or, in other words, the amount of inductance at which the relay will function tends to remain substantially constant.

In order to have the power factor of the circuit of the coils 31 unity so as to obtain the desired reactance characteristic, I connect suitable means such as a condenser 34 in the circuit. On the face of it, the simplest thing to do would be to have the condenser 34 equal in capacitive reactance to the inductive reactance of the circuit, which would provide a resonant circuit. Such an arrangement, however, introduces problems in manufacturing because, by reason of tolerated variations in relay structure due to manufacturing conditions, it is difficult from an economic standpoint always to have the precise condenser value for resonance at the power circuit frequency in order to obtain a unity power factor circuit so as to operate on reactance. Moreover, variable condensers which theoretically would compensate for a lack of uniformity in relay coil structure and other factors are not practicable. Furthermore, even though the theoretically desired resonance condition were simply obtainable, mere variation in the power circuit frequency would result in frequency errors sufficient to affect the proper functioning of the ohm unit. Also slight variations in condenser capacity can produce undesirable changes in accuracy in the response of the ohm unit and thus greatly increase the probability of false operation due to transients occurring at the moment the short-circuit occurs or when a short-circuit is cleared. In order to eliminate these disadvantages, there is provided a resistor 35 in parallel with the condenser 34. Thus, for any given potential winding 29, the resistance 35 lessens the amount of capacitance needed to provide unity power factor and at the same time provides a parallel damping circuit, thereby tending to diminish or limit the transients and insure accuracy of response of the ohm unit.

By proportioning the resistance 35 with respect to the capacitance 34, in accordance with my invention, the circuit of the potential winding 29 not only has the desired power factor at the given frequency but also is dead-beat or critically damped at this and any other frequency. By critically damped, I refer to the border line between the oscillatory and non-oscillatory conditions. In other words, it is that arrangement of the resistance and the inductive and capacitive reactances respectively which permits the current in the circuit to reach its final steady state value in the shortest possible time. This will be more readily understood from a consideration of Fig. 5 which shows the time current characteristics of circuits embodying resistance and inductive and capacitive reactances in series on which a direct current voltage is suddenly impressed. Curve A illustrates the behaviour of the circuit current when the resistance is less than that necessary for critical damping. From this curve it is clear that the current not only reaches its steady state value more quickly than when the resistance has a higher value as in the cases of curves B and C but it also goes beyond the steady state value on the other side and continues to oscillate. When the steady state value is close to the setting of the protective relay for the desired response, this oscillation tends to cause erroneous relay operation. Curve C represents the condition of too much resistance and the steady state is consequently reached too slowly because of the excessive damping. This tends to cause either delayed or erroneous operation because the current and voltage relations both in phase and magnitude in the circuit to be protected are not correctly reproduced in the relay. This must be particularly avoided in high speed relaying practice. In curve B, the resistance has the value necessary to cause the current to reach its final steady state value without oscillation and with the minimum delay.

For a better understanding of my invention, reference may be had to Fig. 2, which illustrates schematically in simplified form the circuit of the potential winding 29 of Fig. 1. In this embodiment of my invention, I have found that if the ohmic value of the resistance 35 is equal to the ohmic value of the condenser 34 and each of these values is equal to twice the lumped reactance 36 of the potential coil circuit, the circuit will be substantially dead-beat and at unity power factor at the frequency of the circuit. By lumped reactance I mean, with reference to Fig. 1, the inductive reactance of the coil 29 plus the leakage reactances of the high reactance transformer 31 and the auto-transformer 30. Since the potential winding circuit has unity power factor, this connection will be suitable for the potential circuit of an induction type reactance ohm unit having the construction shown for the ohm unit in Fig. 1. In other words, by suitably proportioning the inductance, capacitance and resistance of the circuit of a relay winding, in accordance with my invention, the equations for the oscillatory condition, the desired phase angle characteristic and the desired sensitivity of response are simultaneously satisfied, whereby to obtain better and faster high-speed relay operation.

In view of the arrangement described, it will be obvious that the energization of the winding 29 is proportional to $(I_2-I_3)X-K_2E_{23} \sin \phi$, where $K_2$ is a constant, $X$ is the reactance setting of the relay, and $\phi$ the angle between the voltage and the current of the circuit. Considering the energization of the windings 29 in conjunction with the current windings 24, 25, 26, and 27, the torque of the ohm element on its rotor 16 in a direction to close its contacts is $$(I_2-I_3)^2X-K_2E_{23}(I_2-I_3) \sin \phi.$$

At the balance point, $$K_2E_{23}(I_2-I_3) \sin \phi = (I_2-I_3)^2X,$$

or, in terms of its reactance response, $$X=\frac{K_2E_{23} \sin \phi}{(I_2-I_1)}$$

In other words, the ohm unit closes its contacts when the reactance of the circuit to the point of fault is less than the value $X$, $K_2$ being controllable by the tapped potential transformer 30. Obviously, the above expression for $X$ can be reduced to the general or more simple form $$X=\frac{KE \sin \phi}{I},$$

where $K$ is a constant and $E$ and $I$ represent the desired circuit current and voltage necessary to give the desired reactance response.

In order to have a stepped time-distance characteristic such that the circuit breaker 5 may be tripped substantially instantaneously for all faults within the section of the circuit 1—2—3 between the bus 4 and the next adjacent station for all faults up to a given percentage of length, for example, 90% of the protected line section extending from the bus 4 and a time delay tripping for faults beyond this point and over a predetermined range of distance in the next section and a still greater time limit for tripping to take care of conditions which may arise due to failure of some particular relay, there are provided a timing unit 37 and means such as a transfer relay 38 for automatically varying the reactance setting of the ohm unit 9. The timing unit includes an electromagnetic motor unit 39 which, when energized, stores energy in a spring 40. This energy is released through an escapement mechanism 41 to actuate a movable contact 42 so that it may engage different sets of adjustably positioned contacts 43, 44, after a time delay dependent upon the positioning of these contacts and the initial position of the movable contact 42. The transfer relay 38 is provided to change the ohmic setting of the ohm unit so that with only one ohm unit two or more reactance settings may be provided. For this purpose, the transfer relay 38 is in effect a double-pole double-throw device arranged when energized to close contacts 45 and 46 and when de-energized to close contacts 47 and 48. The arrangement is such that the timing unit 37 is under the control of the starting unit and the transfer relay 38 is under the control of the starting unit, the timing unit and a substantially instantaneous fault detector such as an overcurrent relay 49. The special function of this relay is to prevent false tripping in the event of a blown fuse in the potential transformer 20. The timing unit and the transfer relay are connected in control circuits which are energized from a suitable source such as the battery 50. The control circuit of the timing unit includes a conductor 51, the winding 39 of the timing unit 37, a conductor 52, contacts 53 and 54 of the starting unit 8, a conductor 55, and the battery 50. The contacts of the starting unit may be protected by suitable arc-quenching means such as a resistor 56 and a condenser 57 connected across them.

The control circuit of the transfer relay 38 is from the positive side of the battery 50, indicated by a plus sign adjacent the contact timer bar 58, the timer contacts 42 and 43, a conductor 59, current limiting means such as the resistor 60 when necessary, the winding of the transfer relay 38, conductor 61 and the contacts 62 of the fault detector relay 49, conductor 63, the contacts 64 and 54 of the starting unit and the conductor 55 to the minus side of the battery 50.

The ultimate tripping control action may be accomplished by an auxiliary seal-in relay 65 whose contacts can more readily handle the current closing requirements of the trip coil 6 and also, when once operated, definitely maintains the circuit of the trip coil closed even though there should be some tendency to open of the contacts of the starting and ohm units.

Assuming the parts positioned as shown in the drawing, and that a fault occurs on the circuit 1—2—3 within the instantaneous tripping zone range, then the circuit controlling members 17 of the starting unit and ohm unit close their respective contacts 53, 54, 64 and 66 and the overcurrent relay 49 closes its contacts 62. The closing of the starting unit contacts 53, 54 completes the circuit of the timer energizing winding 39 to start the timer into action. The circuit of the seal-in relay 65 is completed as follows: the battery 50, the conductor 55, the contacts 53, 64 of the starting unit, the conductor 63, the contacts 62 of the overcurrent relay 49, a conductor 67, the contacts 66 of the ohm unit, conductors 68 and 69, the winding of the seal-in relay 65, the auxiliary switch 7 of the circuit breaker 5, the trip coil 6 and the conductor 70. The operation of the seal-in relay 65 closes the circuit of the trip coil 6 as well as completing its own circuit to maintain itself energized until such time as its circuit is opened at the auxiliary switch 7 of the circuit breaker when the circuit breaker opens.

If the fault is beyond the instantaneous zone of the circuit, then the reactance of the circuit to the fault is too high for the ohm unit to close its contacts. The transfer relay 38 picks up to open its contacts 47 and 48, and to close its contacts 45 and 46 whereby to change the setting of the ohm unit to a reactance value which covers the intermediate zone. The transfer relay picks up quickly enough and drops out slowly enough to permit the operation of the ohm unit 9 if the fault is within the intermediate or second zone. When the ohm unit contacts 66 are closed, the seal-in relay 65 will be energized in a trip circuit as follows: the battery 50, the conductor 55, the contacts 54, 64 of the starting unit, the conductor 63, the contacts 62 of the overcurrent relay 49, the conductor 67, the contacts 66 of the ohm unit, the conductors 68, 69, the winding of the seal-in relay 65, the circuit breaker auxiliary switch 7, the trip coil 6, and the conductor 70 to the battery 50.

If the fault is beyond the intermediate zone so that the circuit reactance to the fault is too high for the ohm unit to close its contacts and the starting unit contacts remain closed until the contact operating member 42 of the timer 37 engages contacts 44, the circuit of the seal-in relay 65 will be completed as follows: the battery 50, the conductor 55, the contacts 54, 64 of the starting unit, the conductor 63, the contacts 62 of the overcurrent relay 49, the conductor 61, the contacts 44 and 42 of the timer, the conductors 71 and 69, the winding of the seal-in relay 65 the circuit breaker auxiliary switch 7, the trip coil 6 and the conductor 70 to the battery 50. In other words, if a relay in any section fails to trip instantaneously or in intermediate time, then the relay in the adjacent section will operate in the back-up time to disconnect its own section and thereby separate the faulty section from the system at that end.

In order to simplify the illustration of my invention, I have shown a protective arrangement for only one phase of the system, but it will be obvious to those skilled in the art that in order to obtain complete protection for a three-phase system, for example, three distance relays, each embodying a starting unit, an ohm unit, and a timing unit, together with their appurtenances, will be required. Moreover, the connections of these devices will be obvious by analogy from the illustration shown for the protection of the phase 2—3.

The series parallel circuit shown schematically in Fig. 2 is desirable for obtaining unity and lagging power factors with highly inductive relay windings. For relay windings which have low inductance, the embodiment of my invention shown schematically in Fig. 3 is applicable. Thus, for example, in the induction dynamometer type of relay, one form of which is disclosed in United States Letters Patent #2,000,803, dated May 7, 1935, the potential coil is practically at unity power factor because of the short-circuiting action of the inductor ring. With such a construction, the relay potential winding can be represented by the resistance 35' in Fig. 3 and a separate reactor 36' should be provided in parallel with it. For dead-beat action the ohmic values of the winding 35' and the reactor 36' should be equal to each other and to twice that of the condenser 34'.

In Fig. 4, I have shown schematically an arrangement which is suitable for use in relays such as disclosed in United States Letters Patent #1,919,969, dated July 25, 1933. In this arrangement the condenser 34", the resistor 35" and the relay winding 36" are connected in series. The relay winding is normally short-circuited through the starting unit back contacts 56", and the circuit controlling member 60" as disclosed in the patent. For critical damping or dead-beat action at unity power factor, with this arrangement the ohmic values of the inductive and capacitive reactances of the coil circuit are equal to each other, and each is half as great in ohmic value as the resistance of the circuit in ohms. In other words, if R is the resistance, $X_L$ the inductive reactance of the circuit and $X_C$ the capacitive reactance of the circuit, then $R=2X_L=2X_C$. It will be noted that in each of the Figs. 2, 3 and 4 I have indicated the inherent resistance of the coil circuit by the resistance element 361. This resistance should be considered in proportioning a circuit for the desired power factor and the critical damping or dead-beat action. For example, in the induction cup type unit used to illustrate an application of my invention to a distance relay, the equivalent resistance 361 representing electric and magnetic losses and damping is half the total value described for dead-beat action. Consequently, for practical application, and use with this type of relay the series external resistance 35″ required would be only half the value mentioned above, that is, $R=X_L=X_C$.

Similarly, the correct proportions of the resistance and reactance 34, 35 and 36 of Fig. 2 depend on the inherent resistance 361 of the winding 36. If the inherent resistance 361 is appreciably large, then a compensating corresponding increase must be made in the resistance 35. If the resistance 361 is great enough it may be necessary to use the series circuit of Fig. 4 instead of the circuit shown in Fig. 2. In this case the starting switch 56″, 60″ would be omitted because of the difference in the relay construction.

For a practical example, the correct proportions have been given for the induction cup type of relay described herein. In this relay, the internal resistance and the magnetic losses have damping effects similar to a decrease in the value of the resistance 35 in Fig. 2 and require the value of this resistance to be larger, that is, about double the value necessary for the resistance 35 if the winding 36 were purely inductive and there were no magnetic damping in the relay. It is possible to calculate these quantities if correct allowance be made for the electrical and magnetic losses and the damping effects in the relay.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination an alternating current circuit, an electroresponsive device comprising a winding, means for energizing said winding in accordance with a voltage derived from said circuit, the resistance and the inductive and capacitive reactances of the circuit including said winding being proportioned to provide a substantially critically damped predetermined power factor circuit at the frequency of said alternating current circuit.

2. In combination, an alternating current circuit and an electroresponsive device comprising a winding connected to be energized from said circuit, and a resistor and a condenser connected in parallel with each other and in series with said winding, the ohmic values of the resistor, the capacitor and the inductive reactance of said winding being proportioned to make the circuit including said resistor, condenser, and winding substantially dead beat and to establish the phase angle of the winding circuit at a desired value for the frequency of said alternating current circuit.

3. In combination, an alternating current circuit and an electroresponsive device comprising a potential winding, means for energizing said winding in accordance with a voltage derived from said circuit, the resistance and the inductive and capacitive reactances of the circuit including said potential winding being proportioned to provide a substantially critically damped unity power factor circuit at the frequency of said alternating current circuit.

4. In combination, an alternating current circuit and an electroresponsive device of the induction cup type comprising a winding connected to be energized from said circuit, the circuit of said winding having in series with it a resistance and a capacitive reactance in parallel and each of the same ohmic value and twice the value of the inductive reactance of the circuit including the winding in ohms for rendering the circuit of the winding critically damped at a predetermined frequency while providing a desired phase angle for the circuit of the winding.

5. In combination, an alternating current circuit, an electroresponsive device of the induction cup type comprising a winding connected to be energized from said circuit and a condenser and a resistor connected in parallel with each other and in series with said winding, the ohmic values of said resistor and condenser being the same and twice the ohmic value of the inductive reactance of the composite circuit including said winding, condenser and resistor to render said composite circuit substantially critically damped and at unity power factor for the frequency of said alternating current circuit.

6. In combination, an alternating current circuit and an electroresponsive device comprising a winding connected to be energized from said circuit, and a resistor and a condenser connected in series with each other and the winding of said device, the ohmic values of the inductive and capacitive reactances of the series circuit including said resistor, condenser and winding being equal to each other and the total ohmic resistance of said series circuit being twice as large as the ohmic value of the capacitive reactance of the series circuit at the frequency of said alternating current circuit.

7. In combination, an alternating current circuit and a high speed protective relay of the induction cup type comprising a movable member and means for actuating said member, including a winding connected to be energized from said circuit, a condenser and a resistor connected in parallel with each other and in series with the winding, the ohmic values of said resistor and condenser being the same and twice the ohmic value of the inductive reactance of the composite circuit including said winding, condenser and resistor to cause said relay to have the same response value for both sudden and gradual changes in an electric quantity of said alternating current circuit on the occurrence of faults thereon, and to have maximum sensitivity to fault current lagging the circuit voltage by substantially 90 degrees.

8. In combination, an alternating current circuit and a high speed induction type electroresponsive device comprising a winding connected to be energized from said circuit, a condenser and a resistor connected in series with each other and said winding, the ohmic values of the inductive and capacitive reactances of said series circuit being equal to each other and to half of the ohmic resistance of the series circuit to cause said device to have the same responsive value for both sudden and gradual changes in an electric quantity of said alternating current circuit on the occurrence of a fault thereon and to have a desired phase angle characteristic.

9. In combination an alternating current circuit and an electroresponsive device comprising a unity power factor winding connected to be energized from said circuit, a resistor in parallel with said winding, and a condenser in series with said winding and said resistor the ohmic values of said resistor and said winding being equal to each other and to twice the ohmic value of the condenser.

10. In combination, an alternating current circuit and an electroresponsive device comprising a winding connected to be energized from said circuit, the resistance and the capacitive and inductive reactances of the circuit including said winding being proportioned to substantially critically damp the circuit of the winding while providing a desired phase angle between the current through and the voltage across the winding circuit at the frequency of said alternating current circuit.

11. An electro-responsive device comprising a winding adapted to be energized in accordance with an alternating voltage, the resistance and the inductive and capacitive reactances of the circuit including said winding being proportioned to provide a substantially critically damped predetermined power-factor circuit at the frequency of said alternating voltage.

ALBERT R. van C. WARRINGTON.